United States Patent
Lee et al.

(10) Patent No.: US 9,639,839 B2
(45) Date of Patent: May 2, 2017

(54) FINGERPRINT RECOGNITION CONTROL METHODS FOR PAYMENT AND NON-PAYMENT APPLICATIONS

(71) Applicant: Egis Technology Inc., Taipei (TW)

(72) Inventors: Jung-Chien Lee, Taipei (TW); Chieh-Pin Su, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/660,224

(22) Filed: Mar. 17, 2015

(65) Prior Publication Data

US 2016/0048840 A1    Feb. 18, 2016

Related U.S. Application Data

(60) Provisional application No. 62/036,437, filed on Aug. 12, 2014.

(30) Foreign Application Priority Data

Feb. 3, 2015    (CN) .......................... 2015 1 0055547

(51) Int. Cl.
*G06Q 20/40* (2012.01)
*G06K 9/00* (2006.01)
(Continued)

(52) U.S. Cl.
CPC ....... *G06Q 20/40145* (2013.01); *G06F 21/32* (2013.01); *G06F 21/85* (2013.01);
(Continued)

(58) Field of Classification Search
None
See application file for complete search history.

(56) References Cited

U.S. PATENT DOCUMENTS 8,150,772 B2 *  4/2012  Mardikar ........... G06Q 20/1085
                                            705/64
8,762,742 B2    6/2014  Buer
(Continued)

FOREIGN PATENT DOCUMENTS

CN           10252444 A    7/2012

OTHER PUBLICATIONS

Park, Byungkwan, et al. "Impact of embedding scenarios on the smart card-based fingerprint verification." Information Security Applications. Springer Berlin Heidelberg, 2006. 110-120.*
(Continued)

*Primary Examiner* — Chan Park
*Assistant Examiner* — Geoffrey E Summers

(57) ABSTRACT

An electronic device is provided. The electronic device includes a first memory unit for storing a non-payment application, a first processor, a fingerprint sensing unit and a security element including a second memory unit and a second processor. The second memory unit stores a payment application and user fingerprint information. When the second processor executes the payment application, the fingerprint sensing unit captures a fingerprint image of a user's finger and the second processor transmits the fingerprint image to the first processor via a secure channel. The first processor calculates biometric characteristics of the fingerprint image to generate to-be-recognized fingerprint information which is transmitted to the second processor via the secure channel. When the second processor determines that the to-be-recognized fingerprint information matches the user fingerprint information, the second processor generates an authentication signal for a payment transaction.

10 Claims, 5 Drawing Sheets

(51) Int. Cl.
*G06F 21/32* (2013.01)
*G06Q 20/32* (2012.01)
*G06F 21/85* (2013.01)

(52) U.S. Cl.
CPC ..... *G06K 9/00006* (2013.01); *G06Q 20/3227* (2013.01); *G06K 9/00087* (2013.01)

(56) References Cited

U.S. PATENT DOCUMENTS

| | | | | |
|---|---|---|---|---|
| 2005/0226479 | A1* | 10/2005 | Takahashi | G06K 9/00026 382/124 |
| 2008/0155268 | A1* | 6/2008 | Jazayeri | G06F 21/32 713/186 |
| 2009/0067686 | A1* | 3/2009 | Boshra | G06F 21/32 382/124 |
| 2010/0026451 | A1* | 2/2010 | Erhart | G06K 9/00013 340/5.53 |
| 2011/0082791 | A1* | 4/2011 | Baghdasaryan | G06Q 20/10 705/44 |
| 2014/0181959 | A1 | 6/2014 | Li et al. | |

OTHER PUBLICATIONS

Herzberg, Amir. "Payments and banking with mobile personal devices." Communications of the ACM 46.5 (2003): 53-58.*
Garcia, Mariano López, and EF Canto Navarro. "FPGA implementation of a ridge extraction fingerprint algorithm based on microblaze and hardware coprocessor." Field Programmable Logic and Applications, 2006. FPL'06. International Conference on. IEEE, 2006.*

* cited by examiner

FINGERPRINT RECOGNITION CONTROL METHODS FOR PAYMENT AND NON-PAYMENT APPLICATIONS

CROSS REFERENCE TO RELATED APPLICATIONS

This application claims the benefit of U.S. Provisional Application No. 62/036,437 filed on Aug. 12, 2014, the entirety of which is incorporated by reference herein.

This application claims priority of China Patent Application No. 201510055547.06, filed on Feb. 3, 2015, the entirety of which is incorporated by reference herein.

BACKGROUND OF THE INVENTION

Field of the Invention

The present invention relates to fingerprint recognition, and in particular, to an electronic device and associated fingerprint recognition control methods capable of performing fingerprint recognition processes corresponding to payment applications and non-payment applications.

Description of the Related Art

With advances in technology, it has become more and more popular for a user to make payments using an electronic device. When the user is going to make a payment on an electronic device, the payment transaction is usually performed on a security element authorized by a trusted source (e.g. a bank or credit card-issuing institution). However, the computation ability of the conventional security element is very limited. If the fingerprint recognition required by the payment transaction is entirely performed by the security element, it may take much time to perform the operations associated with fingerprint recognition. Accordingly, there is a demand for an electronic device and associated fingerprint recognition control methods to increase the speed and security of fingerprint recognition for payment transaction.

BRIEF SUMMARY OF THE INVENTION

A detailed description is given in the following embodiments with reference to the accompanying drawings.

In an exemplary embodiment, an electronic device is provided. The electronic device comprises a first memory unit for storing a non-payment application, a first processor, a fingerprint sensing unit and a security element. The security element is coupled to the fingerprint sensing unit, and comprises a second processor and a second memory unit for storing a payment application, first user fingerprint information and second user fingerprint information. When the second processor executes the payment application, the fingerprint sensing unit captures a fingerprint image of a user's finger and the second processor transmits the captured fingerprint image to the first processor via a secure channel. The first processor calculates biometric characteristics of the fingerprint image to generate to-be-recognized fingerprint information, and transmits the to-be-recognized fingerprint information to the second processor via the secure channel. The second processor further determines whether the to-be-recognized fingerprint information matches the second user fingerprint information. When the second processor determines that the to-be-recognized fingerprint information matches the second user fingerprint information, the second processor generates an authentication signal for a payment transaction.

In another exemplary embodiment, a fingerprint recognition control method for use in an electronic device is provided. The electronic device comprises a first memory unit storing a non-payment application, a first processor, a fingerprint sensing unit and security element. The security element is coupled to the fingerprint sensing unit, and comprises a second processor and a second memory unit for storing a payment application, first user fingerprint information and second user fingerprint information. The method comprises the steps of: when the second processor executing the payment application, the fingerprint sensing unit capturing a fingerprint image of a user's finger; the second processor transmitting the captured fingerprint image to the first processor via a secure channel; the first processor calculating biometric characteristics of the fingerprint image to generate to-be-recognized fingerprint information; transmitting the to-be-recognized fingerprint information to the second processor via the secure channel; the second processor determining whether the to-be-recognized fingerprint information matches the second user fingerprint information; and when the second processor determining that the to-be-recognized fingerprint information matches the second user fingerprint information, the second processor generating an authentication signal for a payment transaction.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
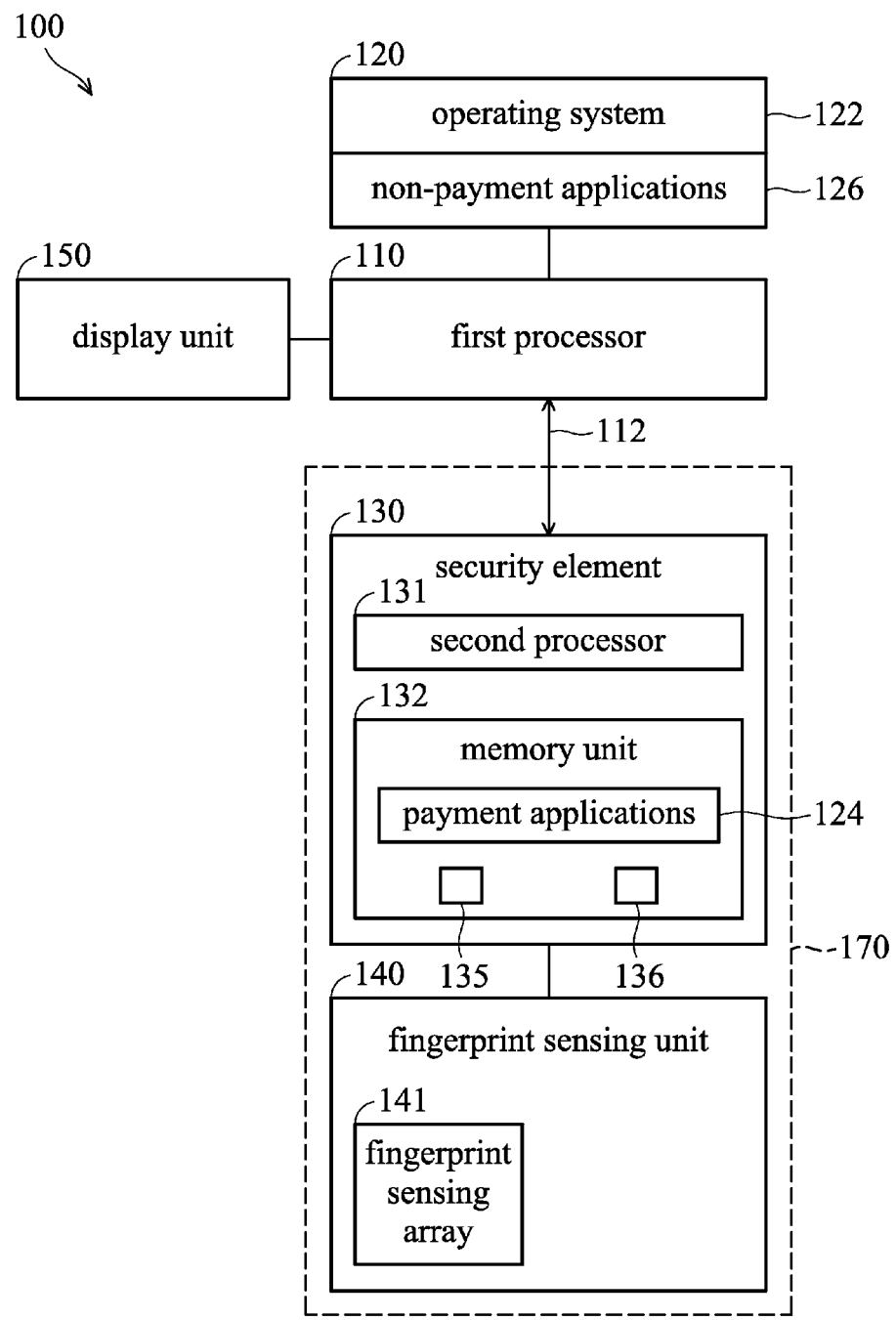
FIG. 1 is a block diagram of an electronic device in accordance with an embodiment of the invention.

FIG. 1 is a block diagram of an electronic device in accordance with an embodiment of the invention. The electronic device 100, for example, may be a cellular phone, a smartphone, or a tablet PC. In an embodiment, the electronic device 100 comprises a first processor 110, a memory unit 120, a security element 130, a fingerprint sensing unit 140 and a display unit 150. The memory unit 120 stores an operating system 122 and application software including non-payment applications 126 for execution by the first processor 110. The security element 130 is a tamper-resistant platform (typically a one chip secure microcontroller) capable of securely hosting applications and their confidential and cryptographic data (e.g. key management) in accordance with the rules and security requirements set forth by a set of well-identified trusted authorities. In an embodiment, the security element 130 comprises a second processor 131 and a memory unit 132. The second processor 131, for example, may be a central processing unit (CPU) or a microcontroller. The memory unit 132 may be a non-volatile memory which includes one or more fingerprint databases recording fingerprint information of a user. The memory unit 132 also stores payment applications 124 to be executed by the second processor 131. The non-payment applications 126 are stored in the memory unit 120, and are applications requiring fingerprint authentication for executing operations which are not related to payment transactions.

The tamper resistant security of the security element 130 provides a secure and trusted environment for executing a payment application. The security element 130 controls interactions between trusted sources (a bank or credit card-issuing institution), the trusted application (the payment application 124) stored on the security element 130 and third parties (a company the user is making a payment to). The secure domain protects the user's credentials, and processes the payment transaction in a trusted environment, ensuring the security of the user's data.

The memory unit 132 comprises a first fingerprint database 135 and a second fingerprint database 136. The first fingerprint database 135 stores first user fingerprint information for non-payment applications 126, and the second fingerprint database 136 stores second user fingerprint information for payment applications 124, wherein the first user fingerprint information and the second user fingerprint information are registered fingerprint information.

The fingerprint sensing unit 140 may comprise a fingerprint sensor array 141 having a plurality of fingerprint sensors for sensing fingerprint images of a user. For example, the fingerprint sensors may be optical sensors, ultrasonic sensors, capacitive sensors or thermal sensors, but the invention is not limited thereto. In an embodiment, the security element 130 and the fingerprint sensing unit 140 may be integrated into a module 170 or a chip, which is difficult to tamper with.

Figure 2A:
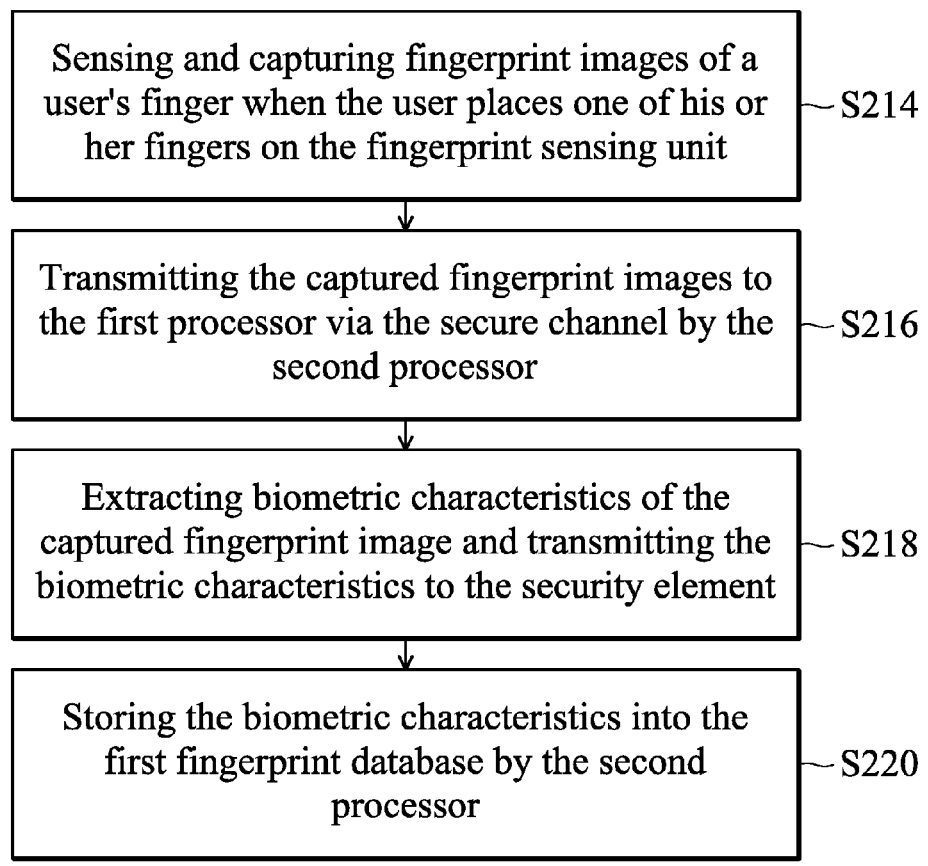
FIG. 2A is a flow chart illustrating a fingerprint enrollment process for a non-payment application in accordance with an embodiment of the invention.

FIG. 2A is a flow chart illustrating a fingerprint enrollment process for a non-payment application in accordance with an embodiment of the invention. Referring to FIG. 2A and FIG. 1, in step S214, the fingerprint sensing unit 140 captures fingerprint images of a user's finger when the user places one of his or her fingers on the fingerprint sensing unit 140. In step S216, the second processor 131 transmits the captured fingerprint images to the first processor 110 via the secure channel 112 (e.g. Transport Layer Security (TLS) or Secure Socket Layer (SSL)). In step S218, the first processor 110 extracts biometric characteristics of the captured fingerprint images and transmits the biometric characteristics to the second processor 131, wherein the aforementioned biometric characteristics may be, for example, feature points of the fingerprint image. In step S220, the second processor 131 stores the biometric characteristics into the first fingerprint database 135. It should be noted that the aforementioned flow is for enrolling the fingerprint of a single finger. The user may enroll one or more fingers for a single non-payment application.

Figure 2B:
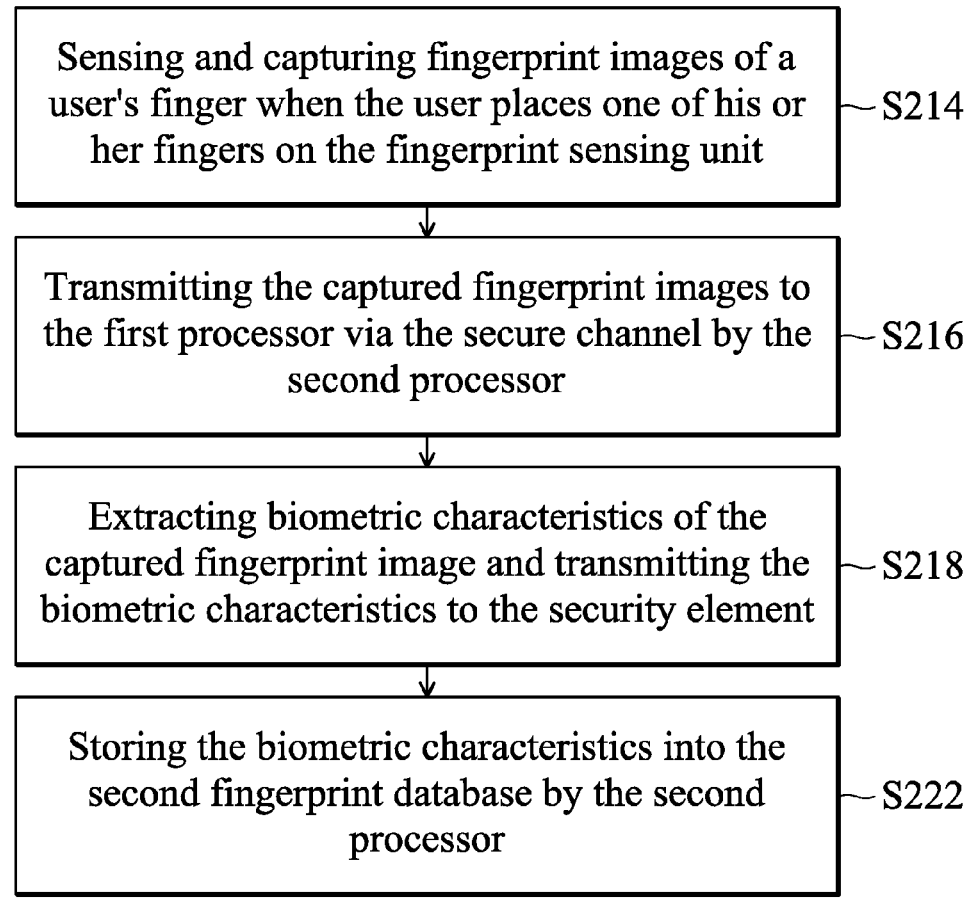
FIG. 2B is a flow chart illustrating a fingerprint enrollment process for a payment application in accordance with an embodiment of the invention.

FIG. 2B is a flow chart illustrating a fingerprint enrollment process for a payment application 124 in accordance with an embodiment of the invention. Here, the payment application 124 requires fingerprint authentication for executing operations to fulfill a successful payment transaction. In step S214, the fingerprint sensing unit 140 captures fingerprint images of a user's finger when the user places one of his or her finger on the fingerprint sensing unit 140. In step S216, the second processor 131 transmits the captured fingerprint images to the first processor 110 via the secure channel 112. In step S218, the first processor 110 extracts biometric characteristics of the captured fingerprint images and transmits the biometric characteristics to the second processor 131. Then, in step S222, the second processor 131 stores the biometric characteristics into the second fingerprint database 136.

Figure 3A:
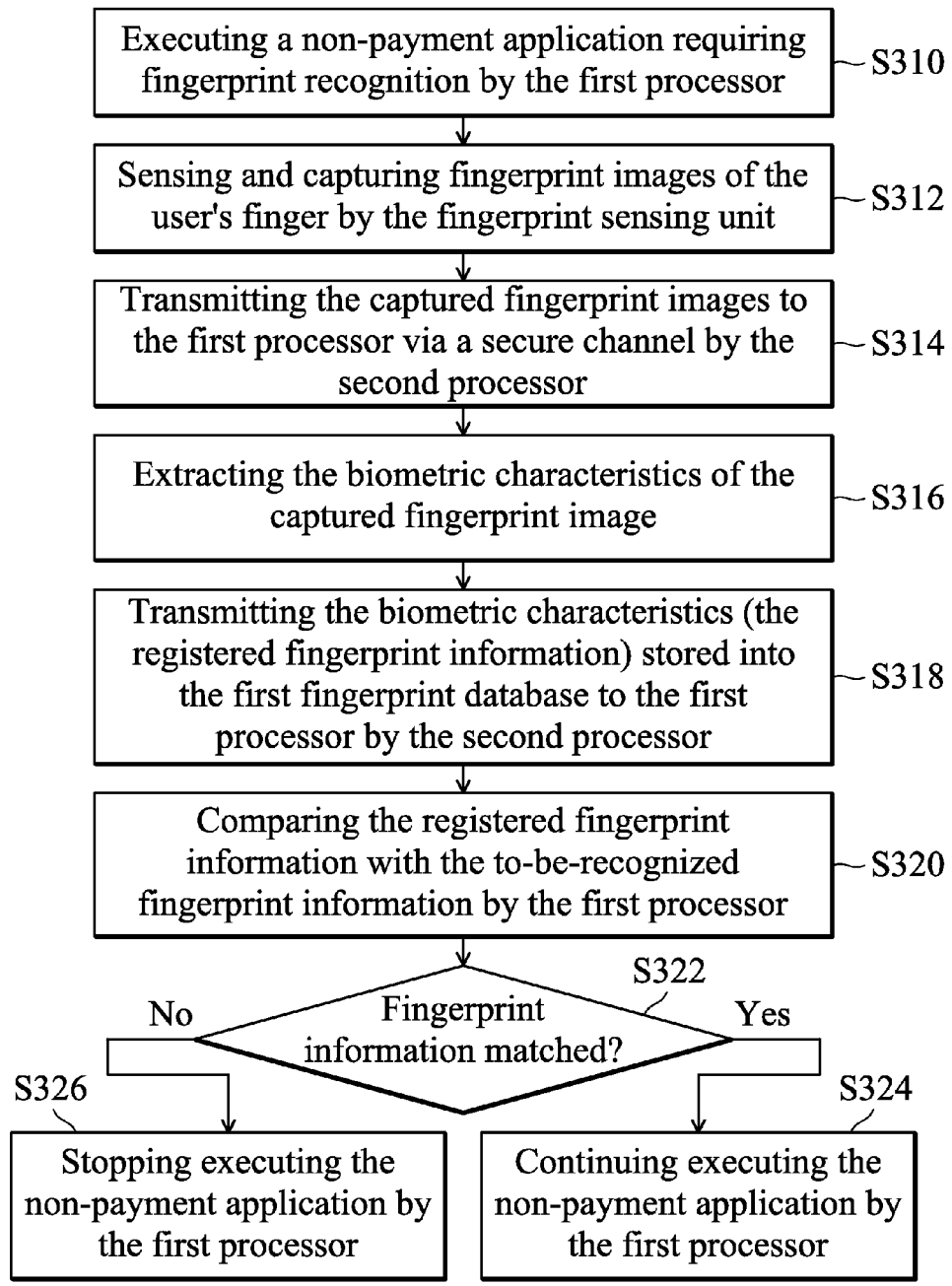
FIG. 3A is a flow chart of a fingerprint recognition process for a non-payment application in accordance with an embodiment of the invention.

FIG. 3A is a flow chart of a fingerprint recognition process for a non-payment application in accordance with an embodiment of the invention. In step S310, the first processor 110 executes a non-payment application 126 requiring fingerprint recognition. In step S312, the fingerprint sensing unit 140 captures fingerprint images of the user's finger. In step S314, the second processor 131 transmits the captured fingerprint images to the first processor 110 via a secure channel 112 (e.g. an SSL channel). In step S316, the first processor 110 extracts the biometric characteristics of the captured fingerprint images, i.e. to-be-recognized fingerprint information.

In step S318, the second processor 131 transmits the first user fingerprint information (i.e. the registered fingerprint information) stored into the first fingerprint database 135 to the first processor 110 via the secure channel 112. In step S320, the first processor 110 compares the first user fingerprint information with the to-be-recognized fingerprint information. In step S322, the first processor 110 determines whether the to-be-recognized fingerprint information matches the first user fingerprint information. If the to-be-recognized fingerprint information matches the first user fingerprint information, the first processor 110 continues executing the non-payment application 126 (step S324). If the to-be-recognized fingerprint information does not match the first user fingerprint information, the first processor 110 stops executing the non-payment application 126 (step S326).

In an alternative embodiment, the first user fingerprint information for the non-payment application is stored in the memory unit 120. Accordingly, the first processor 110 may directly retrieve the first user fingerprint information from the memory unit 120, and compare the first user fingerprint information with the to-be-recognized fingerprint information.

Figure 3B:
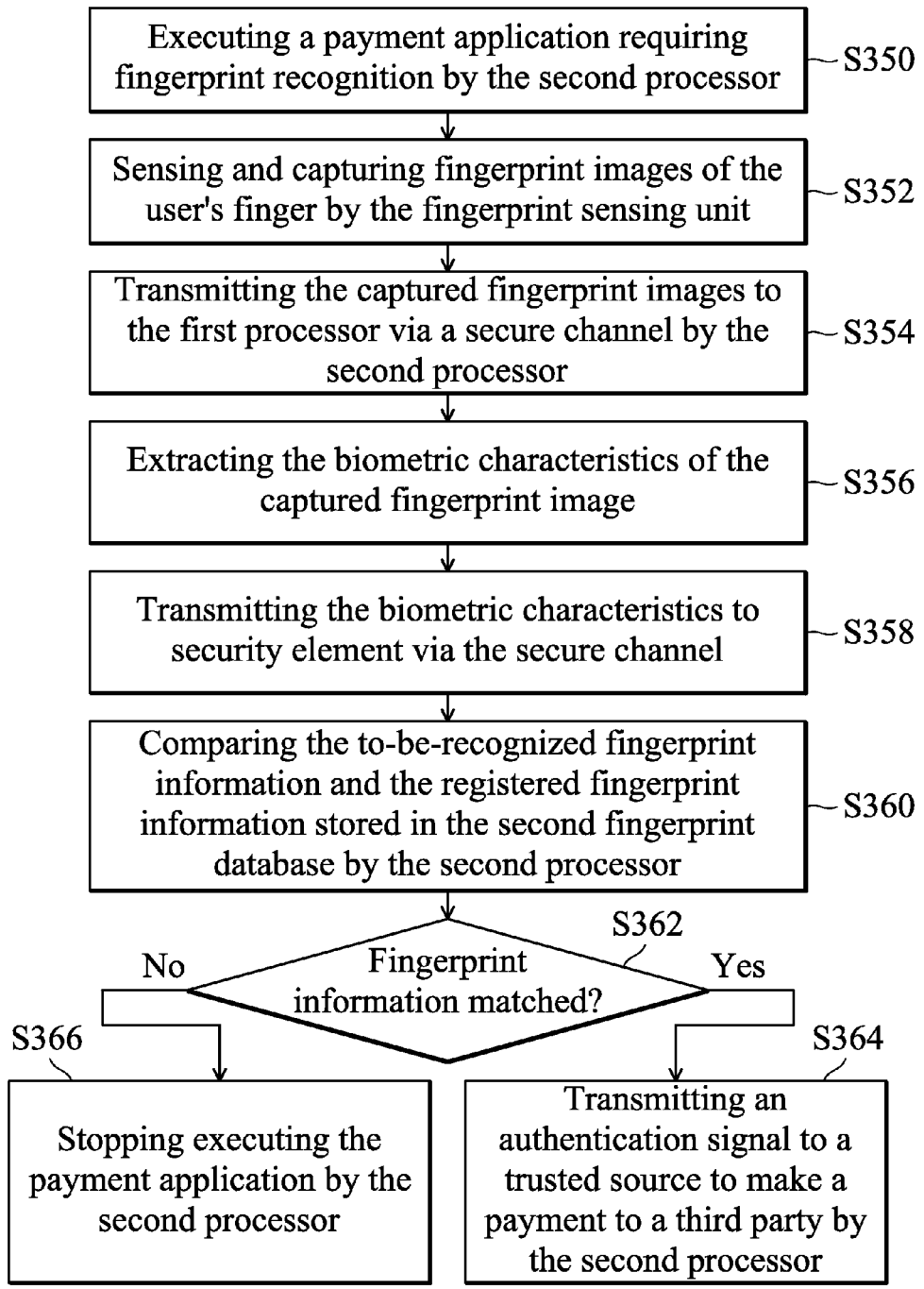
FIG. 3B is a flow chart of a fingerprint recognition process for a payment application in accordance with an embodiment of the invention.

FIG. 3B is a flow chart of a fingerprint recognition process for a payment application in accordance with an embodiment of the invention. In step S350, the second processor 131 executes the payment application 124, and the payment application 124 requires fingerprint recognition for further operations. In step S352, the fingerprint sensing unit 140 captures fingerprint images of the user's finger. In step S354, the second processor 131 transmits the captured fingerprint images to the first processor 110 via a secure channel 112 (e.g. an SSL channel). In step S356, the first processor 110 extracts the biometric characteristics (e.g. feature points) of the captured fingerprint images. In step S358, the first processor 110 transmits the biometric characteristics (i.e. to-be-recognized fingerprint information) to the second processor 131 via the same secure channel 112.

In step S360, the second processor 131 compares the to-be-recognized fingerprint information and the second user fingerprint information stored in the second fingerprint database 136. In step S362, the second processor 131 determines whether the to-be-recognized fingerprint information matches the second user fingerprint information. If the to-be-recognized fingerprint information matches the second user fingerprint information, the second processor 131 transmits an authentication signal to a trusted source, for example, a bank, so that the bank will make a payment to a third party accordingly (step S364). If the to-be-recognized fingerprint information does not match the second user fingerprint information, the second processor 131 will stop the execution of the payment application (step S366) and no payment transaction will be made.

It should be noted that the first processor 110 of the electronic device 100 could operate a rich mobile operating system (mobile OS). In an alternative embodiment, the first processor 110 may comprise the Trusted Execution Environment (TEE), and the present invention is implemented in the TEE. The TEE is a secure area of the first processor 110 of the electronic device 100, such as a smart phone, a tablet pc, a set-top box or a television. The TEE is an isolated execution environment that guarantees and protects the confidentiality and integrity of the stored-inside code and data. Generally, the TEE offers an execution space that provides a higher level of security than a rich mobile operating system (mobile OS) and more functionality and computation ability than a secure element (SE).

In view of the above, an electronic device and associated fingerprint recognition control method for payment applications and non-payment application are provided. The electronic device and the associated fingerprint recognition control method are capable of determining whether to use the first processor in the electronic device or the second processor in the security element to perform fingerprint information matching according to the type (e.g. payment application or non-payment application) of the application. When a user utilizes the payment application to make a payment, the fingerprint information matching is performed by the second processor in the security element so as to ensure that the fingerprint information is not leaked, thereby increasing the security level of the payment transaction.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a first memory unit, for storing a non-payment application;
a first processor;
a fingerprint sensing unit; and
a security element, coupled to the fingerprint sensing unit, comprising:
a second memory unit, for storing a payment application, first user fingerprint information, and second user fingerprint information, wherein the first user fingerprint information is for the non-payment application and the second user fingerprint information is for the payment application; and
a second processor;
wherein when the second processor executes the payment application;
the fingerprint sensing unit captures a fingerprint image of a user's finger, and the second processor transmits the captured fingerprint image to the first processor via a secure channel;
the first processor calculates biometric characteristics of the fingerprint image to generate to-be-recognized fingerprint information, and transmits the to-be-recognized fingerprint information to the second processor via the secure channel; and
the second processor determines whether the to-be-recognized fingerprint information matches the second user fingerprint information;
when the second processor determines that the to-be-recognized fingerprint information matches the second user fingerprint information, the second processor generates and transmits an authentication signal for a payment transaction to a trusted source; and
wherein when the first processor executes the non-payment application:
the fingerprint sensing unit captures a fingerprint image of the user's finger, and the second processor transmits the captured fingerprint image to the first processor via the secure channel;
the first processor calculates biometric characteristics of the fingerprint image to generate to-be-recognized fingerprint information;
the second processor transmits the first user fingerprint information to the first processor via the secure channel; and
the first processor determines whether the to-be-recognized fingerprint information matches the first user fingerprint information;
when the first processor determines that the to-be-recognized fingerprint information matches the first user fingerprint information, the first processor continues on executing the non-payment application,
when the first processor determines that the to-be-recognized fingerprint information does not match the first user fingerprint information, the first processor stops executing the non-payment application.

2. The electronic device as claimed in claim 1, wherein the secure channel is implemented according to the Transport Layer Security (TLS) protocol or the Secure Socket Layer (SSL) protocol.

3. The electronic device as claimed in claim 1, wherein when the second processor determines that the to-be-recognized fingerprint information does not match the second user fingerprint information, the second processor stops executing the payment application.

4. The electronic device as claimed in claim 1, wherein the first processor further provides a trusted execution environment for executing operations of fingerprint recognition.

5. The electronic device as claimed in claim 1, wherein the trusted source will perform the payment transaction to make a payment to a third party according to the authentication signal.

6. A fingerprint recognition control method, for use in an electronic device, wherein the electronic device comprises a first memory unit storing a non-payment application; a first processor; a fingerprint sensing unit; and security element coupled to the fingerprint sensing unit, wherein the security element comprises a second processor and a second memory unit for storing a payment application, first user fingerprint information and second user fingerprint information, wherein the first user fingerprint information is for the non-payment application and the second user fingerprint information is for the payment application, the method comprising:
when the second processor executes the payment application;

the fingerprint sensing unit capturing a fingerprint image of a user's finger;

the second processor transmitting the captured fingerprint image to the first processor via a secure channel;

the first processor calculating biometric characteristics of the fingerprint image to generate to-be-recognized fingerprint information;

the first processor transmitting the to-be-recognized fingerprint information to the second processor via the secure channel;

the second processor determining whether the to-be-recognized fingerprint information matches the second user fingerprint information; and when the second processor determining that the to-be-recognized fingerprint information matches the second user fingerprint information, the second processor generating and transmitting an authentication signal for a payment transaction to a trusted source; and when the first processor executes the non-payment application:

the fingerprint sensing unit capturing a fingerprint image of the user's finger;

the second processor transmitting the captured fingerprint image to the first processor via the secure channel;

the first processor calculating biometric characteristics of the fingerprint image to generate to-be-recognized fingerprint information;

the second processor transmitting the first user fingerprint information to the first processor via the secure channel;

the first processor determining whether the to-be-recognized fingerprint information matches the first user fingerprint information;

when the first processor determines that the to-be-recognized fingerprint information matches the first user fingerprint information in the first database, the first processor continuing on executing the non-payment application; and when the first processor determines that the to-be-recognized fingerprint information does not match the first user fingerprint information, the first processor stopping executing the non-payment application.

7. The method as claimed in claim 6, wherein the secure channel is implemented according to the Transport Layer Security (TLS) protocol or the Secure Socket Layer (SSL) protocol.

8. The method as claimed in claim 6, further comprising:
when the second processor determines that the to-be-recognized fingerprint information does not match the second user fingerprint information, the second processor stopping executing the payment application.

9. The method as claimed in claim 6, wherein the first processor further provides a trusted execution environment for executing operations of fingerprint recognition.

10. The method as claimed in claim 6, wherein the trusted source will perform the payment transaction to make a payment to a third party according to the authentication signal.

* * * * *